(12) United States Patent
Huang

(10) Patent No.: US 9,200,173 B2
(45) Date of Patent: Dec. 1, 2015

(54) MODIFIED POLYVINYL ALCOHOL COATED FILM USED FOR PRINTING AND PREPARATION METHOD THEREOF

(75) Inventor: Hongcun Huang, Hainan (CN)

(73) Assignee: HAINAN SHINER INDUSTRIAL CO., LTD., Hainan (CN)

( * ) Notice: Subject to any disclaimer, the term of this patent is extended or adjusted under 35 U.S.C. 154(b) by 206 days.

(21) Appl. No.: 13/581,669

(22) PCT Filed: May 5, 2011

(86) PCT No.: PCT/CN2011/073685
§ 371 (c)(1),
(2), (4) Date: Aug. 29, 2012

(87) PCT Pub. No.: WO2011/157085
PCT Pub. Date: Dec. 22, 2011

(65) Prior Publication Data
US 2013/0004764 A1 Jan. 3, 2013

(30) Foreign Application Priority Data

Jun. 16, 2010 (CN) .......................... 2010 1 0208100

(51) Int. Cl.
*B32B 27/08* (2006.01)
*C09D 129/04* (2006.01)
*C08J 7/04* (2006.01)
*B41M 5/52* (2006.01)

(52) U.S. Cl.
CPC ............... *C09D 129/04* (2013.01); *C08J 7/042* (2013.01); *B41M 5/5254* (2013.01); *C08J 2323/12* (2013.01); *C08J 2375/04* (2013.01); *C08J 2429/04* (2013.01); *C08J 2433/06* (2013.01); *Y10T 428/263* (2015.01); *Y10T 428/265* (2015.01); *Y10T 428/273* (2015.01); *Y10T 428/31554* (2015.04); *Y10T 428/31576* (2015.04); *Y10T 428/31587* (2015.04); *Y10T 428/31913* (2015.04)

(58) Field of Classification Search
None
See application file for complete search history.

(56) References Cited

U.S. PATENT DOCUMENTS

| 3,753,769 | A | * | 8/1973 | Steiner ........................... 428/331 |
| 4,695,503 | A | * | 9/1987 | Liu et al. ........................ 428/207 |
| 4,780,340 | A | * | 10/1988 | Takahashi et al. .......... 427/393.5 |
| 5,508,113 | A | * | 4/1996 | Knoerzer ...................... 428/500 |
| 5,985,425 | A | * | 11/1999 | Tomizawa et al. ............. 428/212 |
| 6,406,775 | B1 | * | 6/2002 | Houde ....................... 428/32.34 |
| 6,406,797 | B1 | | 6/2002 | VanPutte |
| 6,902,645 | B2 | * | 6/2005 | Miller ......................... 156/272.6 |
| 2003/0068534 | A1 | * | 4/2003 | Ohkawa et al. ................ 428/701 |
| 2003/0157354 | A1 | | 8/2003 | Van Veghel et al. |
| 2005/0037152 | A1 | * | 2/2005 | Xie et al. ....................... 427/553 |

FOREIGN PATENT DOCUMENTS

| CN | 1687264 | A | 10/2005 |
| CN | 101147902 | A | 3/2008 |
| CN | 101638159 | A | 2/2010 |
| WO | WO-96/16799 | A1 | 6/1996 |

OTHER PUBLICATIONS

International Search Report (in Chinese with English translation) and Written Opinion (in Chinese) for PCT/CN2011/073685, mailed Aug. 11, 2011; ISA/CN.
Extended European Search Report regarding Application No. 11795051.9, dated Sep. 23, 2014.

* cited by examiner

*Primary Examiner* — Elizabeth A Robinson
*Assistant Examiner* — Daniel D Lowrey
(74) *Attorney, Agent, or Firm* — Harness, Dickey & Pierce, P.L.C.

(57) ABSTRACT

A modified polyvinyl alcohol (PVA) coated film used for printing and a preparation method thereof are provided. Said film comprises a coating layer, a primer layer and a substrate in turn. Said coating layer comprises acrylic coating layer and modified PVA coating layer in turn. Said modified PVA coating layer contacts with the primer layer. Said modified PVA coated film has the properties of higher barrier and moisture-proof and is suitable for the printing of most of printing inks. Said film can be not only directly used to package nuts or the likes, but also used to form a composite compound with other materials suitable for packaging cookie, cake or the likes.

15 Claims, No Drawings

MODIFIED POLYVINYL ALCOHOL COATED FILM USED FOR PRINTING AND PREPARATION METHOD THEREOF

CROSS-REFERENCE TO RELATED APPLICATIONS

This application is a 371 U.S. National Stage of International Application No. PCT/CN2011/073685, filed on May 5, 2011, which claims priority to Chinese Patent Application No. 201010208100.5, filed with the Chinese Patent Office on Jun. 16, 2010, titled "A modified polyvinyl alcohol coating film for printing and manufacturing method thereof". Both the international application and the Chinese application are incorporated herein by reference in their entireties.

FIELD OF THE INVENTION

The present invention relates to the field of a new environment-friendly polymeric material, in particular, it relates to a modified polyvinyl alcohol coated film for printing and preparation method thereof.

BACKGROUND OF THE INVENTION

Traditional food barrier flexible packaging materials mainly include two categories of products: those based on polyvinylidene chloride and those based on polyamide. The flexible packaging materials based on polyvinylidene chloride are more widely used, and account for most of the market. Polyvinylidene chloride has good molecular symmetry, and is liable to form crystal. Besides, polyvinylidene chloride contains a large number of polar chlorine atoms, the presence of these polar chlorine atoms greatly enhance the attraction between the molecules; thus, the molecules are tightly packed such that polyvinylidene chloride based material has a high barrier property. However, because of the large content of chlorine atoms in polyvinylidene chloride, harmful gases are produced during the disposal of polyvinylidene chloride by combustion. In recent years, with increasing environmental pressure, the development of new high barrier environmentally friendly materials in lieu of polyvinylidene chloride has become the trend.

Polyvinyl alcohol products in dry state have excellent oxygen barrier property far superior to that of polyvinylidene dichloride. However, the polyvinyl alcohol molecules contain a large number of strongly hydrophilic hydroxyl groups, which are liable to form hydrogen bonds with water in wet state, and associate with water via the hydrogen bonds. Upon the association with water, the barrier properties of the polyvinyl alcohol products will be greatly reduced. For example, polyvinyl alcohol products completely lose their original oxygen barrier property at a relative humidity of 50%, and thus can not substantially be used as a food packaging material.

In order to improve the moisture-proof property of polyvinyl alcohol, the prior art focuses on chemical modification approaches, wherein the interaction with hydrogen bonds is reduced as much as possible provided that the high barrier properties possessed by the molecular structure are maintained, and the prior art conceives solving the problem by improving the water-proof property, such that the modified polyvinyl alcohol products maintain good gas barrier properties under high humidity.

The modified polyvinyl alcohol products are quite poor in printability despite the moisture-proof is greatly improved. This is because, modified polyvinyl alcohol coating has very low adhesion to ink, as a result, the ink and coating are prone to peel off during printing. The modified polyvinyl alcohols are especially unsuitable for use in an environmentally friendly ink such as a water-based ink. On the other hand, most packaging products have to be subjected to printing; therefore, the promotion and application of the modified polyvinyl alcohol products are greatly restricted.

SUMMARY OF THE INVENTION

Aiming at the problems involved in the printing of the prior modified polyvinyl alcohol products, the problem to be solved by the present invention is, providing a novel modified polyvinyl alcohol coated film for printing, said coated film having not only excellent oxygen barrier property, but also good thermal sealing performance and outstanding printability, especially excellent conformability to an environmentally friendly ink such as a water-based or an alcohol-based ink.

To address the above technical problem, the present invention provides a modified polyvinyl alcohol coated film for printing, comprising sequentially a coating layer, a primer layer and a substrate, and characterized in that, said coating layer comprises sequentially an acrylic coating layer and a modified polyvinyl alcohol coating layer, and said modified polyvinyl alcohol coating layer contacts with said primer layer; said modified polyvinyl alcohol coating layer is formed by applying a modified polyvinyl alcohol coating composition comprising 50% to 100% by weight of a modified polyvinyl alcohol solution, 0 to 40% by weight of demineralized water, 0 to 10% by weight of a slip agent and 0 to 4% by weight of an anti-adhesion agent onto the surface of said primer layer and drying; said modified polyvinyl alcohol solution is formed by crosslinking reaction between 80% to 95% by weight of polyvinyl alcohol and 5% to 20% by weight of urea;

said acrylic coating layer is formed by applying an acrylic coating composition comprising 25% to 95% by weight of an acrylic emulsion, 0 to 70% by weight of demineralized water, 2% to 15% by weight of a slip agent and 0.1% to 5% by weight of an anti-adhesion agent onto the surface of said modified polyvinyl alcohol coating layer and drying; said acrylic emulsion is formed of a copolymer of 10% to 80% by weight of acrylic acid and 20% to 90% by weight of methyl acrylate or ethyl acrylate;

said substrate is a biaxially oriented polypropylene film or a biaxially oriented polyurethane film;

said primer layer is a coating layer formed of a waterborne polyurethane or waterborne acrylics.

Preferably, said primer layer and said coating layer exist on one surface of said substrate or on both surfaces of said substrate simultaneously.

Preferably, in said modified polyvinyl alcohol coating, the solid content of the modified polyvinyl alcohol solution is 5% to 20%, the solid content of the slip agent is 5% to 30%, and the solid content of the anti-adhesion agent is 3% to 25%.

Preferably, in said acrylic coating, the solid content of the acrylic emulsion is 10% to 60%, the solid content of the slip agent is 10% to 30%, and the solid content of the anti-adhesion agent is 5% to 20%.

Preferably, said slip agent is palm wax.

Preferably, said anti-adhesion agent is silica.

Preferably, the thickness of said modified polyvinyl alcohol coating layer is 0.3 μm to 1.5 μm.

Preferably, the thickness of said acrylic coating layer is 0.1 μm to 2.0 μm.

Preferably, the thickness of said substrate is 10 μm to 100 μm.

Preferably, the coating amount of said primer is 0.1 g/m² to 0.8 g/m².

Accordingly, the present invention further provides a method for preparing a modified polyvinyl alcohol coated film for printing.

A substrate, which is a biaxially oriented polypropylene film or a biaxially oriented polyurethane film, is subjected to a corona treatment;

a primer is pre-coated onto the corona-treated surface of said substrate and dried to form a primer layer on the surface of the substrate;

a modified polyvinyl alcohol coating is uniformly applied onto the surface of said primer layer and dried to form a modified polyvinyl alcohol coating layer on the surface of the primer layer;

an acrylic coating is uniformly applied onto the surface of said modified polyvinyl alcohol coating layer and dried, and subsequently cured at 40° C. to 45° C. for 36 h to 60 h, to produce the modified polyvinyl alcohol coated film for printing;

said modified polyvinyl alcohol coating layer is formed by applying a modified polyvinyl alcohol coating composition comprising 50% to 100% by weight of a modified polyvinyl alcohol solution, 0 to 40% by weight of demineralized water, 0 to 10% by weight of a slip agent and 0 to 4% by weight of an anti-adhesion agent onto the surface of said primer layer and drying; said modified polyvinyl alcohol solution is formed by crosslinking reaction between 80% to 95% by weight of polyvinyl alcohol and 5% to 20% by weight of urea;

said acrylic coating layer is formed by applying an acrylic coating composition comprising 25% to 95% by weight of an acrylic emulsion, 0 to 70% by weight of demineralized water, 2% to 15% by weight of a slip agent and 0.1% to 5% by weight of an anti-adhesion agent onto the surface of said modified polyvinyl alcohol coating layer and drying; said acrylic emulsion is formed of a copolymer of 10% to 80% by weight of acrylic acid and 20% to 90% by weight of methyl acrylate or ethyl acrylate.

Preferably, the coating amount of said modified polyvinyl alcohol coating is 0.25 g/m² to 1.5 g/m²; and the coating amount of said acrylic coating is 0.1 g/m² to 2.0 g/m².

Preferably, the coating speed at which the modified polyvinyl alcohol coating is uniformly applied onto said primer layer is 60 m/min to 200 m/min; and the coating speed at which the acrylic coating is uniformly applied onto the surface of said modified polyvinyl alcohol coating layer is 50 m/min to 220 m/min.

Preferably, the drying mode is either hot air drying or far infrared drying or both. The drying temperature is 90° C. to 140° C., and the drying time is 5 to 20 seconds.

Preferably, the coating is reverse roll-kiss coating.

The present invention provides a modified polyvinyl alcohol coated film for printing. The coated film provided by the present invention is produced by coating the surface of a modified polyvinyl alcohol coating layer with a layer of acrylic coating. Acrylic acid has strong adhesion to ink, thus it can not only enhance the water-proof property of a modified polyvinyl alcohol, but also solve the problem of the poor adaptability of a modified polyvinyl alcohol coating layer to ink, such that the product of the present invention not only has higher barrier and moisture-proof properties, but also adapts to printing by most of the ink currently used. In addition, the coating film is featured by a low production cost and recoverable degradation.

Experiments show that, the modified polyvinyl alcohol coated film for printing provided by the present invention has higher barrier properties even at a relative humidity of 50%, the oxygen transmission rate being about 0.6 ml/m²·24 h to 2.5 ml/m²·24 h. Besides, the bonding strength of the coated film to each of polyamide ink, chlorinated polypropylene ink, polyurethane ink and acrylic esters ink is greater than 95%, which indicates excellent printability. The modified polyvinyl alcohol coated film for printing provided by the present invention can be not only directly used to package nuts or the likes, but also used to form a composite compound with other materials suitable for packaging cookie, cake or the likes.

MODES FOR CARRYING OUT THE PRESENT INVENTION

To further understand the present invention, preferred embodiments of the present invention are described in detail in combination with the following examples. However, it should be understood that these descriptions are only for further illustrating the characteristics and advantages of the present invention, but not for limiting the claims of the present invention.

Anti-adhesion agents in the following examples are silica anti-adhesion agents with a trade name of ABPP05 provided by A. Schulman, Inc. (Belgium); palm wax slip agents are provided by Asahi Kasei Corporation (Japan) under a trade name of KP9800; waterborne acrylic adhesive primers are provided by Beijing Linshi Fine Chemical and New Material Co., Ltd under a trade name of TCL-1; waterborne polyurethane adhesive primers are provided by Dutch DSM company under a trade name of R-610.

Example 1

The following materials are used in this example:

(1). Substrate: a biaxially oriented polypropylene film material with a thickness of 18 μm;

(2). Modified polyvinyl alcohol solution: formed by crosslinking reaction between 90% by weight of polyvinyl alcohol and 10% by weight of urea, the solid content being 7%;

(3). Acrylic emulsion: formed by the copolymerization of 70% by weight of acrylic acid and 30% by weight of methyl acrylate, the solid content being 25%;

(4). Primer: waterborne acrylic adhesive.

The coated film provided by this example is prepared as follows:

1. 200 kg of the modified polyvinyl alcohol solution is added into a stainless steel container, and 1.3 kg of the slip agent, 0.8 kg of the anti-adhesion agent and 10 kg of demineralized water are added successively thereto with stirring. Upon homogenously stirring, a modified polyvinyl alcohol coating to be used for the following step is obtained.

2. The substrate, i.e., the biaxially oriented polypropylene film, is allowed to unreel and then subjected to a corona treatment. The primer is pre-coated with a coating amount of 0.3 g/m², and the modified polyvinyl alcohol coating prepared in Step 1 is uniformly coated onto the substrate film by reverse roll-kiss coating mode. Thus, a modified polyvinyl alcohol coating film without acrylic coat is obtained. The reverse roll-kiss coating mode can solve the problem of adaptability of the deviation of the substrate thickness, and the coating amount is 0.6 g/m². Upon coated, the coating is dried by far infrared and rolled up to form a film. The coating is controlled at a speed of 160 m/min; and the drying is performed at 120° C. for 10 seconds.

3. 120 kg of the acrylic emulsion is weighed, and 1.5 kg of the slip agent, 1.2 kg of the anti-adhesion agent and 20 kg of demineralized water are added successively thereto with stirring. Upon homogenously stirring, an acrylic coating is obtained.

4. The biaxially oriented polypropylene film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 0.7 g/m$^2$. Upon coated, the coating is dried by far infrared and rolled up to form a film. The coating is controlled at a speed of 180 m/min; and the drying is performed at 120° C. for 8 seconds. After drying is completed, a modified polyvinyl alcohol coated film for printing is produced upon curing at 45° C. for two days. At a relative humidity of 50%, the oxygen transmission rate of the coated film is measured as 1.4 ml/m$^2$·24 h.

Example 2

The following materials are used in this example:
(1). Substrate: a biaxially oriented polyester film material with a thickness of 23 μm;
(2). Modified polyvinyl alcohol solution: formed by crosslinking reaction between 92% by weight of polyvinyl alcohol and 8% by weight of urea, the solid content being 10%;
(3). Acrylic emulsion: formed by the copolymerization of 20% by weight of acrylic acid and 80% by weight of ethyl acrylate, the solid content being 30%;
(4). Primer: waterborne polyurethane adhesive.

The coated film provided by this example is prepared as follows:
1. 180 kg of the modified polyvinyl alcohol solution is added into a stainless steel container, and 2.5 kg of the slip agent, 1.5 kg of the anti-adhesion agent and 5 kg of demineralized water are added successively thereto with stirring. Upon homogenously stirring, a modified polyvinyl alcohol coating to be used for the following step is obtained.
2. The substrate, i.e., the biaxially oriented polyester film, is allowed to unreel and then subjected to a corona treatment. The primer is pre-coated with a coating amount of 0.1 g/m$^2$, and the modified polyvinyl alcohol coating prepared in Step 1 is uniformly coated onto the substrate film by reverse roll-kiss coating mode with a coating amount of 0.7 g/m$^2$. Upon coated, the coating is dried by far infrared and rolled up to form a film. Thus, a modified polyvinyl alcohol coating film without acrylic coat is obtained. The coating is controlled at a speed of 110 m/min; and the drying is performed at 130° C. for 15 seconds.
3. 160 kg of the acrylic emulsion is weighed, and 2.0 kg of the slip agent, 1.8 kg of the anti-adhesion agent and 30 kg of demineralized water are added successively thereto with stirring. Upon homogenously stirring, an acrylic coating is obtained.
4. The biaxially oriented polyester film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 1.0 g/m$^2$, the modified polyvinyl alcohol coating layer being entirely covered. Upon coated, the coating is dried by far infrared and rolled up to form a film. The coating is controlled at a speed of 150 m/min; and the drying is performed at 130° C. for 10 seconds. After drying is completed, a modified polyvinyl alcohol coated film for printing is produced upon curing at 40° C. for two days. At a relative humidity of 50%, the oxygen transmission rate of the coated film is measured as 0.8 ml/m$^2$·24 h.

Example 3

The following materials are used in this example:
(1). Substrate: a biaxially oriented polypropylene film material with a thickness of 100 μm;
(2). Modified polyvinyl alcohol solution: formed by crosslinking reaction between 80% by weight of polyvinyl alcohol and 20% by weight of urea, the solid content being 12%;
(3). Acrylic emulsion: formed by the copolymerization of 10% by weight of acrylic acid and 90% by weight of methyl acrylate, the solid content being 55%;
(4). Primer: waterborne polyurethane adhesive.

The coated film provided by this example is prepared as follows:
1. 300 kg of the modified polyvinyl alcohol solution is added into a stainless steel container, and 1.2 kg of the slip agent, 2.5 kg of the anti-adhesion agent and 15 kg of demineralized water are added successively thereto with stirring. Upon homogenously stirring, a modified polyvinyl alcohol coating to be used for the following step is obtained.
2. The substrate, i.e., the biaxially oriented polypropylene film, is allowed to unreel and then subjected to a corona treatment. The primer is pre-coated with a coating amount of 0.5 g/m$^2$, and the modified polyvinyl alcohol coating prepared in Step 1 is uniformly coated onto the substrate film by reverse roll-kiss coating mode with a coating amount of 1.2 g/m$^2$. Upon coated, the coating is dried by far infrared and rolled up to form a film. Thus, a modified polyvinyl alcohol coating film without acrylic coat is obtained. The coating is controlled at a speed of 120 m/min; and the drying is performed at 120° C. for 18 seconds.
3. 200 kg of the acrylic emulsion is weighed, and 4.0 kg of the slip agent, 1.5 kg of the anti-adhesion agent and 45 kg of demineralized water are added successively thereto with stirring. Upon homogenously stirring, an acrylic coating is obtained.
4. The biaxially oriented polypropylene film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 2.0 g/m$^2$, the modified polyvinyl alcohol coating layer being entirely covered. Upon coated, the coating is dried by far infrared and rolled up to form a film. The coating is controlled at a speed of 220 m/min; and the drying is performed at 120° C. for 6 seconds. After drying is completed, a modified polyvinyl alcohol coated film for printing is produced upon curing at 42° C. for two days. At a relative humidity of 50%, the oxygen transmission rate of the coated film is measured as 0.7 ml/m$^2$·24 h.

Example 4

The following materials are used in this example:
(1). Substrate: a biaxially oriented polyester film material with a thickness of 10 μm;
(2). Modified polyvinyl alcohol solution: formed by crosslinking reaction between 85% by weight of polyvinyl alcohol and 5% by weight of urea, the solid content being 8.5%;
(3). Acrylic emulsion: formed by the copolymerization of 50% by weight of acrylic acid and 50% by weight of methyl acrylate, the solid content being 20%;
(4). Primer: waterborne acrylic adhesive.

The coated film provided by this example is prepared as follows:

1. 190 kg of the modified polyvinyl alcohol solution is added into a stainless steel container, and 1.5 kg of the slip agent, 1.2 kg of the anti-adhesion agent and 12 kg of demineralized water are added successively thereto with stirring. Upon homogenously stirring, a modified polyvinyl alcohol coating to be used for the following step is obtained.

2. The substrate, i.e., the biaxially oriented polyester film, is allowed to unreel and then subjected to a corona treatment. The primer is pre-coated with a coating amount of 0.8 g/m$^2$, and the modified polyvinyl alcohol coating prepared in Step 1 is uniformly coated onto the substrate film by reverse roll-kiss coating mode with a coating amount of 1.0 g/m$^2$. Upon coated, the coating is dried by far infrared and rolled up to form a film. Thus, a modified polyvinyl alcohol coating film without acrylic coat is obtained. The coating is controlled at a speed of 140 m/min; and the drying is performed at 130° C. for 13 seconds.

3. 150 kg of the acrylic emulsion is weighed, and 1.5 kg of the slip agent, 0.8 kg of the anti-adhesion agent and 36 kg of demineralized water are added successively thereto with stirring. Upon homogenously stirring, an acrylic coating is obtained.

4. The biaxially oriented polyester film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 1.0 g/m$^2$, the modified polyvinyl alcohol coating layer being entirely covered. Upon coated, the coating is dried by far infrared and rolled up to form a film. The coating is controlled at a speed of 170 m/min; and the drying is performed at 120° C. for 9 seconds. After drying is completed, a modified polyvinyl alcohol coated film for printing is produced upon curing at 45° C. for two days. At a relative humidity of 50%, the oxygen transmission rate of the coated film is measured as 1.0 ml/m$^2$·24 h.

Example 5

The following materials are used in this example:
(1). Substrate: a biaxially oriented polypropylene film material with a thickness of 10 μm;
(2). Modified polyvinyl alcohol solution: formed by crosslinking reaction between 95% by weight of polyvinyl alcohol and 5% by weight of urea, the solid content being 20%;
(3). Acrylic emulsion: formed by the copolymerization of 25% by weight of acrylic acid and 75% by weight of ethyl acrylate, the solid content being 60%;
(4). Primer: waterborne polyurethane adhesive.

The coated film provided by this example is prepared as follows:

1. 250 kg of the modified polyvinyl alcohol solution is added into a stainless steel container, and 3.0 kg of the slip agent, 1.9 kg of the anti-adhesion agent and 35 kg of demineralized water are added successively thereto with stirring. Upon homogenously stirring, a modified polyvinyl alcohol coating to be used for the following step is obtained.

2. The substrate, i.e., the biaxially oriented polypropylene film, is allowed to unreel and then subjected to a corona treatment. The primer is pre-coated with a coating amount of 0.8 g/m$^2$, and the modified polyvinyl alcohol coating prepared in Step 1 is uniformly coated onto the substrate film by reverse roll-kiss coating mode with a coating amount of 1.5 g/m$^2$. Upon coated, the coating is dried by far infrared and rolled up to form a film. Thus, a modified polyvinyl alcohol coating film without acrylic coat is obtained. The coating is controlled at a speed of 100 m/min; and the drying is performed at 140° C. for 16 seconds.

3. 220 kg of the acrylic emulsion is weighed, and 2.2 kg of the slip agent, 2.2 kg of the anti-adhesion agent and 31 kg of demineralized water are added successively thereto with stirring. Upon homogenously stirring, an acrylic coating is obtained.

4. The biaxially oriented polypropylene film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 2.0 g/m$^2$, the modified polyvinyl alcohol coating layer being entirely covered. Upon coated, the coating is dried by far infrared and rolled up to form a film. The coating is controlled at a speed of 190 m/min; and the drying is performed at 125° C. for 8 seconds. After drying is completed, a modified polyvinyl alcohol coated film for printing is produced upon curing at 40° C. for two days. At a relative humidity of 50%, the oxygen transmission rate of the coated film is measured as 0.6 ml/m$^2$·24 h.

Example 6

The following materials are used in this example:
(1). Substrate: a biaxially oriented polyester film material with a thickness of 100 μm;
(2). Modified polyvinyl alcohol solution: formed by crosslinking reaction between 88% by weight of polyvinyl alcohol and 12% by weight of urea, the solid content being 8%;
(3). Acrylic emulsion: formed by the copolymerization of 22% by weight of acrylic acid and 78% by weight of methyl acrylate, the solid content being 25%;
(4). Primer: waterborne acrylic adhesive.

The coated film provided by this example is prepared as follows:

1. 280 kg of the modified polyvinyl alcohol solution is added into a stainless steel container, and 2.8 kg of the slip agent, 2.4 kg of the anti-adhesion agent and 18 kg of demineralized water are added successively thereto with stirring. Upon homogenously stirring, a modified polyvinyl alcohol coating to be used for the following step is obtained.

2. The substrate, i.e., the biaxially oriented polyester film, is allowed to unreel and then subjected to a corona treatment. The primer is pre-coated with a coating amount of 0.3 g/m$^2$, and the modified polyvinyl alcohol coating prepared in Step 1 is uniformly coated onto the substrate film by reverse roll-kiss coating mode with a coating amount of 0.7 g/m$^2$. Upon coated, the coating is dried by far infrared and rolled up to form a film. Thus, a modified polyvinyl alcohol coating film without acrylic coat is obtained. The coating is controlled at a speed of 120 m/min; and the drying is performed at 140° C. for 14 seconds.

3. 150 kg of the acrylic emulsion is weighed, and 2.0 kg of the slip agent, 2.6 kg of the anti-adhesion agent and 27 kg of demineralized water are added successively thereto with stirring. Upon homogenously stirring, an acrylic coating is obtained.

4. The biaxially oriented polyester film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 1.2 g/m$^2$, the modified polyvinyl alcohol coating layer being entirely covered. Upon coated, the coating is dried by far infrared and rolled up to form a film. The coating is controlled at a speed of 140 m/min; and the drying is performed at 120° C. for 11 seconds. After drying is completed, a modified polyvinyl alcohol coated film for printing is produced upon curing at 40° C. for two days. At a relative humidity of 50%, the oxygen transmission rate of the coated film is measured as 0.9 ml/m²·24 h.

Example 7

The following materials are used in this example:
(1). Substrate: a biaxially oriented polypropylene film material with a thickness of 28 μm;
(2). Modified polyvinyl alcohol solution: formed by crosslinking reaction between 91% by weight of polyvinyl alcohol and 9% by weight of urea, the solid content being 5%;
(3). Acrylic emulsion: formed by the copolymerization of 50% by weight of acrylic acid and 50% by weight of methyl acrylate, the solid content being 33%;
(4). Primer: waterborne polyurethane adhesive.

The coated film provided by this example is prepared as follows:
1. 180 kg of the modified polyvinyl alcohol solution is added into a stainless steel container, and 2.4 kg of the slip agent, 1.8 kg of the anti-adhesion agent and 10 kg of demineralized water are added successively thereto with stirring. Upon homogenously stirring, a modified polyvinyl alcohol coating to be used for the following step is obtained.
2. The substrate, i.e., the biaxially oriented polypropylene film, is allowed to unreel and then subjected to a corona treatment. The primer is pre-coated with a coating amount of 0.4 g/m², and the modified polyvinyl alcohol coating prepared in Step 1 is uniformly coated onto the substrate film by reverse roll-kiss coating mode with a coating amount of 0.25 g/m². Upon coated, the coating is dried by far infrared and rolled up to form a film. Thus, a modified polyvinyl alcohol coating film without acrylic coat is obtained. The coating is controlled at a speed of 140 m/min; and the drying is performed at 120° C. for 12 seconds.
3. 100 kg of the acrylic emulsion is weighed, and 1.6 kg of the slip agent, 1.2 kg of the anti-adhesion agent and 42 kg of demineralized water are added successively thereto with stirring. Upon homogenously stirring, an acrylic coating is obtained.
4. The biaxially oriented polypropylene film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 0.7 g/m², the modified polyvinyl alcohol coating layer being entirely covered. Upon coated, the coating is dried by far infrared and rolled up to form a film. The coating is controlled at a speed of 130 m/min; and the drying is performed at 120° C. for 9 seconds. After drying is completed, a modified polyvinyl alcohol coated film for printing is produced upon curing at 40° C. for two days. At a relative humidity of 50%, the oxygen transmission rate of the coated film is measured as 2.5 ml/m²·24 h.

Example 8

The following materials are used in this example:
(1). Substrate: a biaxially oriented polyester film material with a thickness of 12 μm;
(2). Modified polyvinyl alcohol solution: formed by crosslinking reaction between 90% by weight of polyvinyl alcohol and 10% by weight of urea, the solid content being 9%;
(3). Acrylic emulsion: formed by the copolymerization of 40% by weight of acrylic acid and 60% by weight of methyl acrylate, the solid content being 25%;
(4). Primer: waterborne acrylic adhesive.

The coated film provided by this example is prepared as follows:
1. 200 kg of the modified polyvinyl alcohol solution is added into a stainless steel container, and 1.3 kg of the slip agent, 0.9 kg of the anti-adhesion agent and 15 kg of demineralized water are added successively thereto with stirring. Upon homogenously stirring, a modified polyvinyl alcohol coating to be used for the following step is obtained.
2. The substrate, i.e., the biaxially oriented polyester film, is allowed to unreel and then subjected to a corona treatment. The primer is pre-coated with a coating amount of 0.5 g/m², and the modified polyvinyl alcohol coating prepared in Step 1 is uniformly coated onto the substrate film by reverse roll-kiss coating mode with a coating amount of 0.6 g/m². Upon coated, the coating is dried by far infrared and rolled up to form a film. Thus, a modified polyvinyl alcohol coating film without acrylic coat is obtained. The coating is controlled at a speed of 120 m/min; and the drying is performed at 135° C. for 14 seconds.
3. 160 kg of the acrylic emulsion is weighed, and 2.5 kg of the slip agent, 2.1 kg of the anti-adhesion agent and 20 kg of demineralized water are added successively thereto with stirring. Upon homogenously stirring, an acrylic coating is obtained.
4. The biaxially oriented polyester film coated with the modified polyvinyl alcohol coating layer prepared in Step 2 is allowed to unreel once again, and the acrylic coating prepared in Step 3 is uniformly coated onto the surface of the modified polyvinyl alcohol coating layer by reverse roll-kiss coating mode with a coating amount of 0.7 g/m², the modified polyvinyl alcohol coating layer being entirely covered. Upon coated, the coating is dried by far infrared and rolled up to form a film. The coating is controlled at a speed of 130 m/min; and the drying is performed at 120° C. for 11 seconds. After drying is completed, a modified polyvinyl alcohol coated film for printing is produced upon curing at 40° C. for two days. At a relative humidity of 50%, the oxygen transmission rate of the coated film is measured as 1.5 ml/m²·24 h.

The modified polyvinyl alcohol coating films without acrylic coat obtained from Examples 1-8 are numbered 1', 2', 3', 4', 5', 6', 7' and 8' in turn; and the modified polyvinyl alcohol coated films for printing obtained from Examples 1-8 are numbered 1, 2, 3, 4, 5, 6, 7 and 8 in turn. The bonding strengths of the coated films to different inks are tested according to GB/T7707-2008, and the results are listed in Table 1.

TABLE 1

Test results of bonding strengths of the coated films to different inks

| | bonding strengths of the coated films to the ink layers | | | |
|---|---|---|---|---|
| | polyamide ink | chlorinated polypropylene ink | polyurethane ink | acrylate ink |
| 1' | 3% | 4% | 95% | 95% |
| 1 | 97% | 99% | 100% | 100% |
| 2' | 2% | 6% | 96% | 95% |

TABLE 1-continued

Test results of bonding strengths of
the coated films to different inks bonding strengths of the coated films to the ink layers

| | polyamide ink | chlorinated polypropylene ink | polyurethane ink | acrylate ink |
|---|---|---|---|---|
| 2 | 98% | 99% | 100% | 100% |
| 3' | 2% | 5% | 96% | 96% |
| 3 | 98% | 100% | 100% | 100% |
| 4' | 3% | 4% | 96% | 95% |
| 4 | 99% | 99% | 100% | 100% |
| 5' | 2% | 4% | 95% | 95% |
| 5 | 99% | 99% | 100% | 100% |
| 6' | 4% | 4% | 96% | 95% |
| 6 | 99% | 99% | 100% | 100% |
| 7' | 2% | 2% | 95% | 97% |
| 7 | 96% | 98% | 100% | 100% |
| 8' | 1% | 3% | 96% | 97% |
| 8 | 96% | 100% | 100% | 100% |

It can be seen from the above results, the ink adhesion of the coated films is significantly enhanced by covering a layer of acrylic coating, and the modified polyvinyl alcohol coated films provided by the present invention have higher bonding strength to various types of inks and good printability.

Specific examples are used herein to illustrate the principles and embodiments of the present invention. The description of the above examples is used only for facilitating the understanding of the methods and the core idea of the present invention. It should be noted that for the skilled in the art, a number of variations and modifications can be made to the present invention without departing from the principles of the present invention, such variations and modifications also fall within the scope claimed by the present invention as set forth in the claims.

The invention claimed is:

1. A modified polyvinyl alcohol coated film for printing, comprising sequentially a coating layer, a primer layer and a substrate, wherein said coating layer comprises sequentially an acrylic coating layer and a modified polyvinyl alcohol coating layer, and said modified polyvinyl alcohol coating layer contacts with said primer layer;
said modified polyvinyl alcohol coating layer is formed by applying a modified polyvinyl alcohol coating composition comprising 50% to 100% by weight of a modified polyvinyl alcohol solution, 0 to 40% by weight of demineralized water, 0 to 10% by weight of a first slip agent and 0 to 4% by weight of a first anti-adhesion agent onto a surface of said primer layer and drying; said modified polyvinyl alcohol solution is formed by crosslinking reaction between 80% to 95% by weight of polyvinyl alcohol and 5% to 20% by weight of urea;
said acrylic coating layer is formed by applying an acrylic coating composition comprising 25% to 95% by weight of an acrylic emulsion, 0 to 70% by weight of demineralized water, 2% to 15% by weight of a second slip agent and 0.1% to 5% by weight of a second anti-adhesion agent onto the surface of said modified polyvinyl alcohol coating layer and drying; said acrylic emulsion is formed of a copolymer consisting of 10% to 80% by weight of acrylic acid and 20% to 90% by weight of methyl acrylate or ethyl acrylate; said acrylic coating layer allows to improve printability;
said substrate is a biaxially oriented polypropylene film or a biaxially oriented polyurethane film, and said substrate is corona treated; and
said primer layer is a coating layer formed of a waterborne polyurethane or waterborne acrylics.

2. The modified polyvinyl alcohol coated film for printing according to claim 1, wherein said primer layer and said coating layer exist on one surface of said substrate or on both surfaces of said substrate simultaneously.

3. The modified polyvinyl alcohol coated film for printing according to claim 1, wherein in said modified polyvinyl alcohol coating, a solid content of the modified polyvinyl alcohol solution is 5% to 20%, the solid content of the first slip agent is 5% to 30%, and the solid content of the first anti-adhesion agent is 3% to 25%.

4. The modified polyvinyl alcohol coated film for printing according to claim 1, wherein in said acrylic coating, a solid content of the acrylic emulsion is 10% to 60%, the solid content of the second slip agent is 10% to 30%, and the solid content of the second anti-adhesion agent is 5% to 20%.

5. The modified polyvinyl alcohol coated film for printing according to claim 1, wherein each of said first and second slip agents is palm wax.

6. The modified polyvinyl alcohol coated film for printing according to claim 1, wherein each of said first and second anti-adhesion agents is silica.

7. The modified polyvinyl alcohol coated film for printing according to claim 1, wherein a thickness of said modified polyvinyl alcohol coating layer is 0.3 µm to 1.5 µm.

8. The modified polyvinyl alcohol coated film for printing according to claim 1, wherein a thickness of said acrylic coating layer is 0.1 µm to 2.0 µm.

9. The modified polyvinyl alcohol coated film for printing according to claim 1, wherein a thickness of said substrate is 10 µm to 100 µm.

10. The modified polyvinyl alcohol coated film for printing according to claim 1, wherein a coating amount of said primer is 0.1 g/m² to 0.8 g/m².

11. A method for preparing a modified polyvinyl alcohol coated film for printing according to claim 1, wherein said method comprises:
subjecting said substrate, which is a biaxially oriented polypropylene film or a biaxially oriented polyurethane film, to a corona treatment;
pre-coating a primer onto the corona-treated surface of said substrate and drying to form said primer layer on the surface of the substrate;
uniformly applying a modified polyvinyl alcohol coating onto the surface of said primer layer and drying to form said modified polyvinyl alcohol coating layer on the surface of the primer layer;
uniformly applying an acrylic coating onto the surface of said modified polyvinyl alcohol coating layer and drying, and subsequently curing at 40° C. to 45° C. for 36 h to 60 h, to produce the modified polyvinyl alcohol coated film for printing;
wherein said modified polyvinyl alcohol coating layer is formed by applying said modified polyvinyl coating composition comprising 50% to 100% by weight of a modified polyvinyl alcohol solution, 0 to 40 wt % of demineralized water, 0 to 10% by weight of said first slip agent and 0 to 4% by weight of said first anti-adhesion agent onto the surface of said primer layer and drying; said modified polyvinyl alcohol solution is formed by crosslinking reaction between 80% to 95% by weight of polyvinyl alcohol and 5% to 20% by weight of urea; and
said acrylic coating layer is formed by applying said acrylic coating composition comprising 25% to 95% by weight of said acrylic emulsion, 0 to 70% by weight of demineralized water, 2% to 15% by weight of said second slip agent and 0.1% to 5% by weight of said second anti-adhesion agent onto the surface of said modified polyvinyl alcohol coating layer and drying; said acrylic emulsion is formed of said copolymer consisting of 10% to 80% by weight of acrylic acid and 20% to 90% by weight of methyl acrylate or ethyl acrylate.

12. The method for preparing a modified polyvinyl alcohol coated film for printing according to claim 11, wherein a coating amount of said modified polyvinyl alcohol coating is 0.25 g/m$^2$ to 1.5 g/m$^2$; and the coating amount of said acrylic coating is 0.1 g/m$^2$ to 2.0 g/m$^2$.

13. The method for preparing a modified polyvinyl alcohol coated film for printing according to claim 11, wherein a coating speed at which the modified polyvinyl alcohol coating is uniformly applied onto said primer layer is 60 m/min to 200 m/min; and the coating speed at which the acrylic coating is uniformly applied onto the surface of said modified polyvinyl alcohol coating layer is 50 m/min to 220 m/min.

14. The method for preparing a modified polyvinyl alcohol coated film for printing according to claim 11, wherein a drying mode is either hot air drying or far infrared drying or both, and wherein a drying temperature is 90° C. to 140° C., and a drying time is 5 to 20 seconds.

15. The method for preparing a modified polyvinyl alcohol coated film for printing according to claim 11, wherein the coating is reverse roll-kiss coating.

\* \* \* \* \*